June 17, 1969  F. E. GOLDING  3,450,179
MIXER-CHOPPER

Filed Dec. 16, 1966  Sheet 1 of 4

INVENTOR.
FRANK E. GOLDING
BY
Thomas H. Grafton
ATTORNEY

June 17, 1969

F. E. GOLDING 3,450,179

MIXER-CHOPPER

Filed Dec. 16, 1966

INVENTOR.
FRANK E. GOLDING
BY
Thomas H. Grafton
ATTORNEY

June 17, 1969  F. E. GOLDING  3,450,179
MIXER-CHOPPER

Filed Dec. 16, 1966  Sheet 4 of 4

INVENTOR.
FRANK E. GOLDING
BY
Thomas H. Grafton
ATTORNEY

3,450,179
Patented June 17, 1969

3,450,179
MIXER-CHOPPER
Frank E. Golding, Toledo, Ohio, assignor, by mesne assignments, to The Reliance Electric and Engineering Company, Toledo, Ohio, a corporation of Ohio
Filed Dec. 16, 1966, Ser. No. 602,196
Int. Cl. B02c 18/30; B01j 7/20, 15/02
U.S. Cl. 146—182                 9 Claims

ABSTRACT OF THE DISCLOSURE

The disclosure describes the combination of a conventional food comminuting machine or chopper defining an inlet, a novel tub having a discharge connection with the inlet, and paddle means rotatably mounted in the tub. The comminuting machine and the tube each is readily detachable from the apparatus as independent units. When the comminuting machine is operatively connected in the apparatus, particularly for the preparation of ground meats, the paddle means functions as mixing means and as input conveying means for the comminuting machine. When the comminuting machine is disconnected from the apparatus, a cover is attached at the discharge connection to retain food in the tub for mixing such foods as salads; removal of the cover permits the paddle means to feed the mixed food into a receptacle placed below the tub outlet. The paddle means includes arm means arranged to lift and let drop food for mixing while advancing the food through the tub. The paddle means and its drive means are mounted for rotation about the axis of a tube which functions both as a means to feed material to be mixed into the tub and a means for rotatably mounting the paddle drive means. A control circuit for two motors which drive the comminuting machine and the paddle means includes a switch for selecting several modes of operation and has safety interlocks for preventing operation of the apparatus if the tub's cover is opened or if the tub is loosened from the apparatus and for preventing operation of the comminuting machine's motor unless the motor for the mixing paddle means also is operating.

---

This invention relates to apparatus for chopping and mixing food products.

The objects of this invention are to improve mixer-chopper apparatus, to increase the capacity of such apparatus, to facilitate the handling and cleaning of such apparatus, to simplify the construction of such apparatus, to simplify the operation of such apparatus, to provide safety interlocks for such apparatus to protect the operator and to protect the chopper portion of such apparatus from being operated while the mixer portion of such apparatus is not being operated, to provide an improved control circuit for such apparatus, and to provide means for feeding material to be mixed into the apparatus on an axis about which mixing paddles are rotated to facilitate such feeding.

One feature of this invention resides in feeding material into the tub through a stationarily mounted tube which functions additionally to rotatably mount the drive means for the mixing paddle means. Feeding the commodity through the tube, i.e., on the axis of rotating of the paddle means, has several advantages. If a first-grind chopper, which is connected to the tube to feed ground material into the tub, were positioned to feed into the open top of the tub, the first-grind chopper would be so high that it would be inconvenient to feed it. The tube is relatively low. Also, by feeding on the axis of rotation of the paddle means, the commodity passes through an ingress opening into the tub that never is obstructed by the rotating paddle means. This facilitates feeding.

Another feature resides in the control circuit which has means for selecting mixing or mixing and chopping modes of operation and the above safety interlocks.

The above and other objects and features of this invention will be appreciated more fully from the following detailed description when read with reference to the accompanying drawings wherein.

Figure 1:
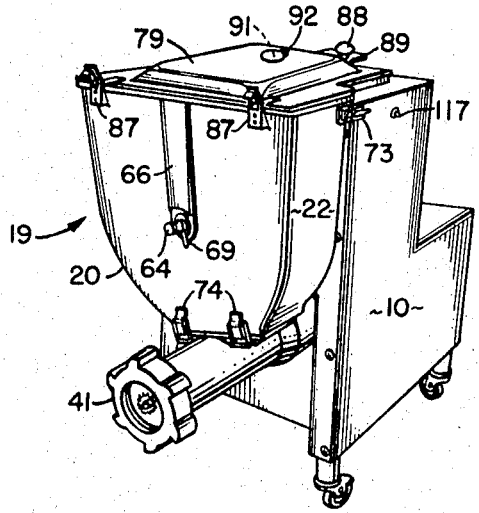
FIG. 1 is a perspective of the mixer-chopper as seen from the front.

Referring to the drawings, the machine for comminuting food includes a housing 10, supported on four legs 11, containing a motor 12 (FIG. 11) for a feed screw 13 rotatably mounted in a feed cylinder 14 to carry a commodity fed into an inlet 15 toward the discharge end of the feed cylinder where the commodity is comminuted. Spiral flutes 16 are formed integrally with the inner surface of the feed cylinder 14 to assist the feed screw 13.

The housing 10 also contains a motor 17 (FIG. 11) for a mixing and feeding paddle 18 rotatably mounted in a tub 19. The tub 19 has a front wall 20, a rear wall 21, side walls 22 and stepped bottom 23 having a lower step 24 which defines a discharge outlet for connection with the inlet 15 of the feed cylinder 14. The tub 19 is provided with shoulders 25 from which depend a plurality of pads 26 which rest on three upper horizontal surfaces 27 of the housing 10 to support the tub. The lower step 24 rests, to further support the tub 19, on a flange 28 on the feed cylinder 14 and which surrounds the comminuting machine inlet 15.

The machine for comminuting food and particularly its means for attaching the feed cylinder 14 to a stationary part of the machine is disclosed in United States Patent No. 3,215,180, issued Nov. 2, 1965 to Herbert D. Braun, the feed cylinder 14 and the feed screw 13 together with their adjuncts being readily detachable from the mixer-chopper as an independent unit. The motor 12 drives the feed screw 13 through conventional gearing contained in a gear case having a stationary cylindrical front head 29 extending through a front wall 30 of the housing 10, the gearing being operatively connected to the feed screw 13 by means of a member 31 provided with a square hole 32 that receives an easily detachable tenon 33 extending from the feed screw 13. In the gear case front head 29, the member 31 is rotatably mounted in a needle bearing 34 which is held in place by means including a stationary oil seal 35. The food is inserted through the inlet 15 and rotation of the feed screw 13 on its longitudinal axis feeds the food through the feed cylinder and against a stationary perforated plate 36 which closes the end of the feed cylinder. The pressure exerted on the food by the feed screw 13 forces it against the face of the perforated plate 36 and causes small protuberances of food to extend into and through the perforations. A rotary knife 37, mounted on the end of the feed screw 13, revolves cutting off small modules of food. A stud 38 fixed in such end of the feed screw, having a square portion 39 received in a correspondingly shaped opening in the knife 37, drives the knife 37. The stud 38 also has a round extension 40 which extends through a correspondingly shaped opening in the perforated plate 36 for support. An end ring 41 threaded on the end of the feed cylinder 14 forces the perforated plate 36 against the knife 37, the knife 37 in turn against the stud 38, and the feed screw tenon 33 in turn into the hole 32 in the driving member 31.

The feed cylinder to front head attachment releasably secures the cylinder upon the front head and includes two bosses 42 opposite each other on the inside of an enlarged hollow end portion 43 of the feed cylinder 14, the end cylinder portion 43 being large enough to fit snugly over the gear case front head 29. The two bosses 42 clear the two flats shown in the above United States Patent No. 3,215,180 when the feed cylinder 14 is turned ninety degrees out of its operative orientation and slipped over the gear case front head 29. When the bosses 42 are slipped over the gear case front head 29 as far as they will go, the bosses are located at an annular circumferential groove in the front head 29 which groove is divided into an upper section 44 and a lower section 45 by the intersecting planes of the flats. The feed cylinder 14 then is turned into its operative position shown in FIGS. 1, 5 and 8. Tight engagement of the cylinder bosses 42, at vertical surfaces 46 on the bosses 42, in the front head groove is produced by tightening up the end ring 41.

To assemble, the feed cylinder 14 is slipped over the gear case front head 29 and then turned into its operative position. The feed screw 13 is so inserted in the cylinder 14 that the screw tenon 33 is received in the hole 32 in the drive member 31, the knife 37 and the perforated plate 36 are slipped in place on the free end of the feed screw 13, and the end ring 41 is turned on the threaded end of the feed cylinder 14. This procedure in reverse detaches the feed cylinder 14 and screw 13 together with their adjuncts from the mixer-chopper. Hence, the comminuting machine is readily detachable from the mixer-chopper apparatus as an independent unit.

The rear tub wall 21 defines an ingress opening 47 through which extends a stationarily mounted tube 48, the tube 48 being fixed as by welding to a rear wall 49 of the housing 10 and extending through the front wall 30 of the housing 10. The front wall 30 has a horizontal portion 50 bent out of the plane of the front wall and the rear wall 49 also has a horizontal portion 51 bent out of the plane of the rear wall, the horizontal portions 50 and 51 functioning as parts of covers for the motors 12 and 17 (FIG. 11) and their adjuncts. The tube 48 functions to rotatably mount a pulley 52, operatively connected to the motor 17 by means of an endless belt 53, having a hub 54 defining a ring 55 at one of its ends. The tube 48 is provided with an abutment face 56, a groove 57 for holding grease, and a rubber O-ring 58 for retaining the grease in the groove. The pulley 52 is retained on the tube 48 by means of centering action provided by the endless belt 53 and by end thrust provided by the paddle 18 urging the pulley 52 against the abutment face 56.

Figure 6:
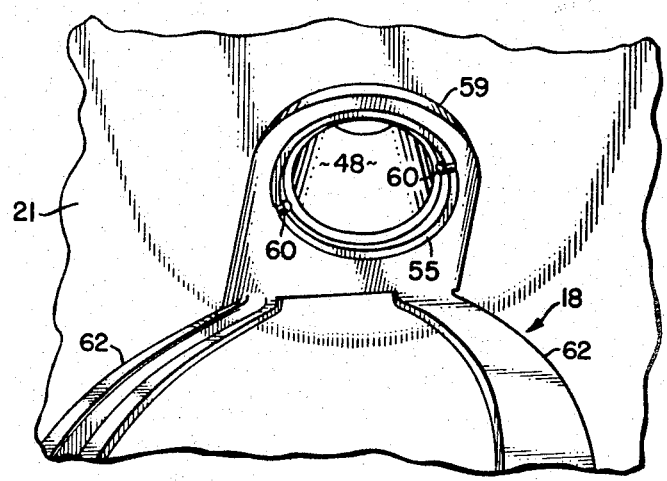
FIG. 6 is an enlarged, fragmentary perspective view of the interior of the mixing tub showing a portion of the mixing paddle.
Figure 7:
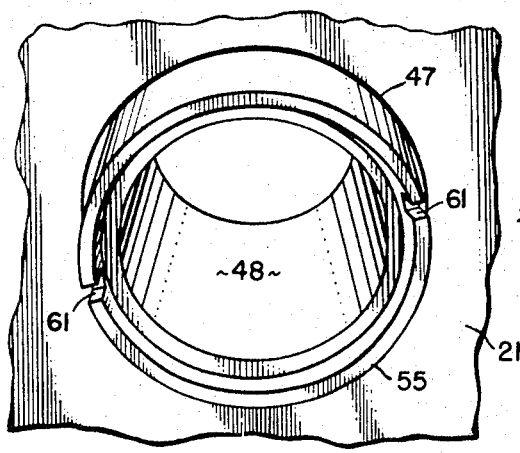
FIG. 7 is a perspective view of the interior of the mixing tub which is similar to FIG. 6 but with the mixing paddle removed.
Figure 8:
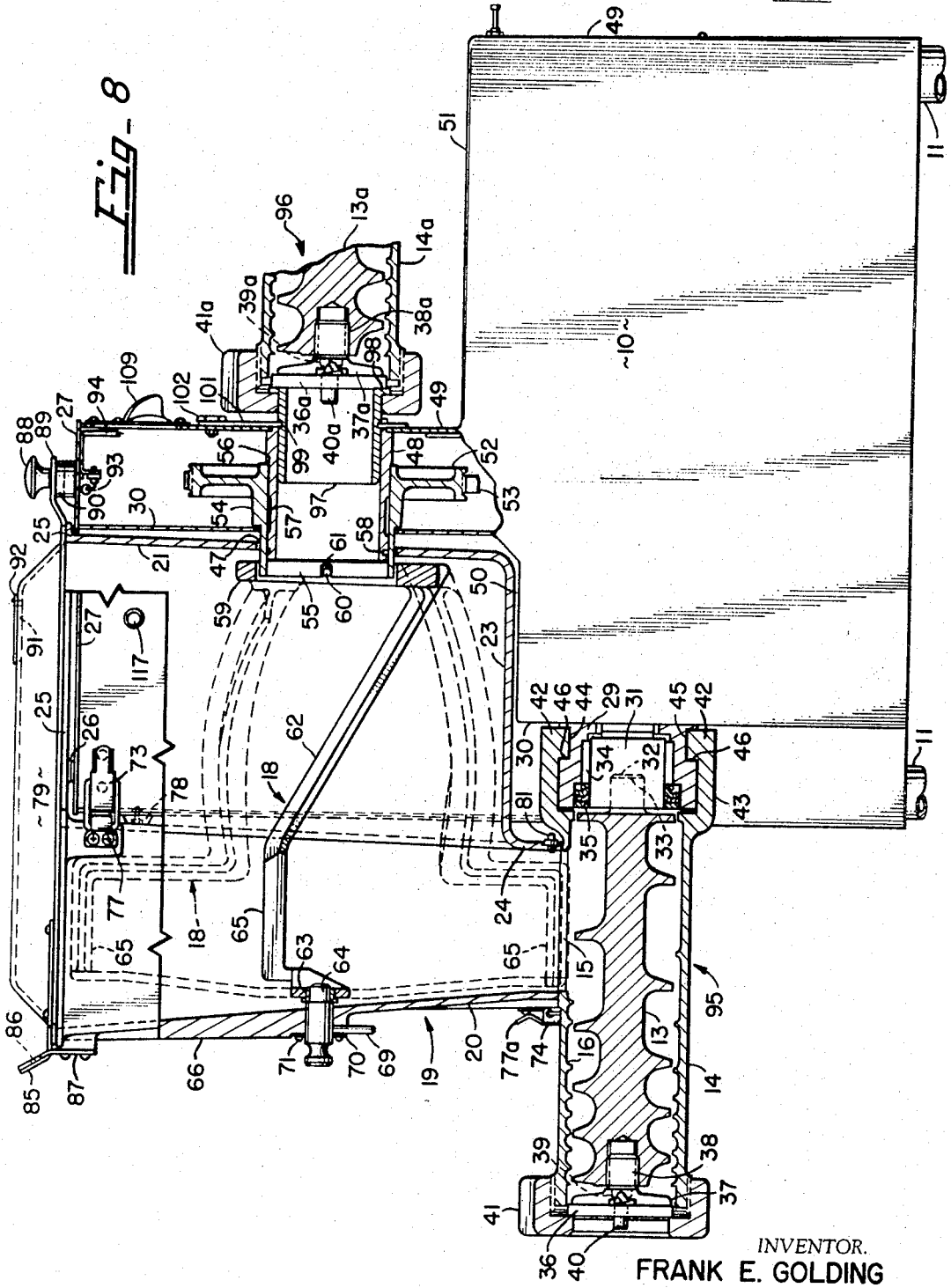
FIG. 8 is an enlarged side elevational view of the mixer-chopper, parts being shown in central vertical section and the legs being broken away.

The paddle 18 includes a ring 59 of a size to fit over the pulley-hub ring 55, there being two pins 60 (180 degrees apart) carried on the inner surface of the paddle ring 59 which are received in two notches 61 in the hub ring 55. This forms a slip connection through which, as the motor 17 drives the pulley-hub ring 55, the paddle 18 is rotated about a generally horizontal axis which coincides with the longitudinal axis of the tube 48. The paddle ring 59 is carried on the ends of two arms 62 (FIGS. 6 and 8) which define at their end remote from the ring 59 a bushing-lined hole 63 which receives a pin 64, extending through the front wall 20 of the tub 19, for rotatably mounting the paddle 18. The paddle arms 62 at the hole 63 are provided with opposed extensions 65 one of which in the broken line position shown in FIG. 8 is very close to the chopper inlet 15. The passing of the arm extensions 65 very close to the chopper inlet 15 forces mixed food into the comminuting machine. The arms 62 and the arm extensions 65 lift the food up in the tub 19 and then let it drop to create a good mixing action while at the same time advancing the mixed food along the horizontal axis of rotation of the paddle 18 toward the chopper inlet 15. The paddle 18 as seen in its broken line position shown in FIG. 8 has the form of a recumbent T.

Figure 2:
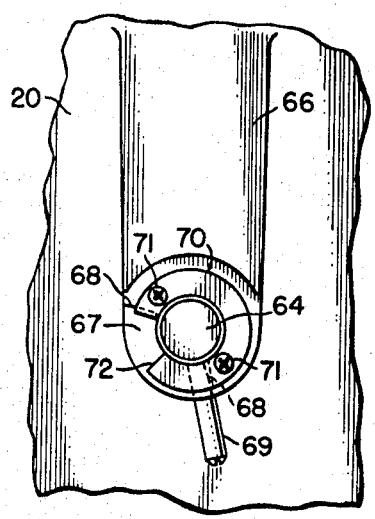
FIG. 2 is an enlarged, fragmentary front elevational view of part of the mixing tub shown in FIG. 1.

The pin 64 is slidable on the axis of rotation of the paddle 18 to facilitate removal of the paddle from the tub 19 and replacement of the paddle in the tub. A thickened portion 66 of the front tub wall 20 defines the hole through which the pin 64 extends and is provided with a cut-away area 67 (FIG. 2) defined by abutment walls 68. The pin 64 carries a handle 69 movable about the axis of the pin 64 between the abutment walls 68. A plate 70, attached to the wall portion 66 by means of two screws 71, has a notch 72 located at the cut-away area 67 of the wall portion 66. When the handle 69 is in its position shown in FIG. 2, the plate 70 prevents the pin 64 from moving to the left as viewed in FIG. 8. However, when the handle 69 is moved clockwise from its position shown in FIG. 2 to the plate notch 72, the pin can be moved to the left as viewed in FIG. 8 for the purpose of removing the paddle 18 from the tub 19. To remove the paddle 18 from the tub 19, the tub 19 is moved slightly to the left as viewed in FIG. 8 so that the paddle ring 59 has room to clear the pulley-hub ring 55, the pin 64 is slid to the left as viewed in FIG. 8 out of the paddle hole 63, and the paddle 18 is moved to the left enough to remove the drive pins 60 from the notches 61. Replacement after cleaning is equally easy. The pins 60 and notches 61 provide a slip connection for attaching the paddle 18 to the drive means and the pin 64 rotatably mounts the left end of the paddle 18 as viewed in FIG. 8, the pin 64 being slidable to facilitate removal of the paddle from the tub and replacement of the paddle in the tub. The drive means, i.e., the pulley 52, hub 54 and hub ring 55, is mounted for rotation on the outer surface of the tube 48.

Figure 5:
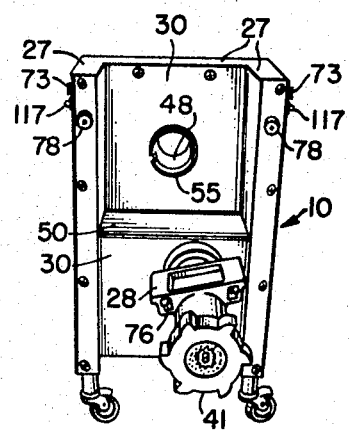
FIG. 5 is a perspective view of the mixer-chopper as seen from the front with the mixing tub removed.

Like the comminuting machine, the tub 19 is readily detachable from the mixer-chopper apparatus as an independent unit. When the tub shoulder pads 26 are in place on the upper horizontal surfaces 27 of the housing 10 and the lower tub step 24 rests on the flange 28 on the feed cylinder 14 as shown in FIG. 8 so that the tub 19 has a discharge connection with the chopper inlet 15, two ordinary trunk or suitcase latches 73 and two additional such latches 74 latch the tub 19 to the housing 10 and to the feed cylinder 14, respectively. One of the latches 74 (carried by the tub 19) is shown enlarged in FIG. 9, it includes a wire-like member 75 which hooks over a hook 76 on the flange 28 of the feed cylinder 14. Pivoting of the handle 77a of the latch 74 counterclockwise as viewed in FIG. 9 releases the member 75 from the hook 76. The latches 73, carried by the housing 10, cooperate with hooks 77 carried by the tub 19 and pull the tub tightly up against rubber grommets 78 on the housing 10. When the comminuting machine and the tub 19 are operatively connected in the apparatus as shown in FIGS. 5 and 8, the paddle 18 functions as mixing means and also as input conveying means for the comminuting machine, i.e., the apparatus functions as a mixer-chopper.

Figure 9:
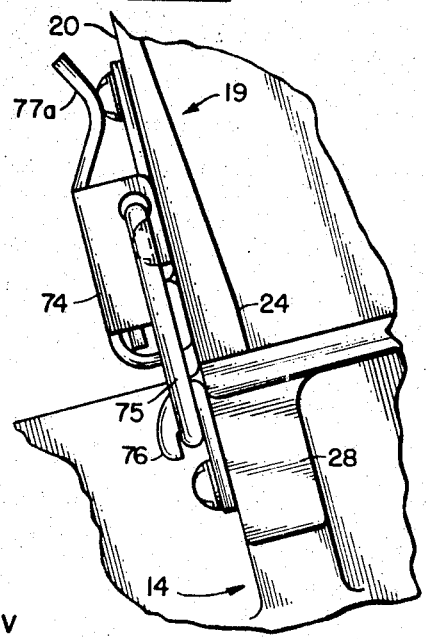
FIG. 9 is an enlarged, fragmentary, side elevational view showing one of the lower suitcase or trunk latches illustrated in FIG. 1.
Figure 10:
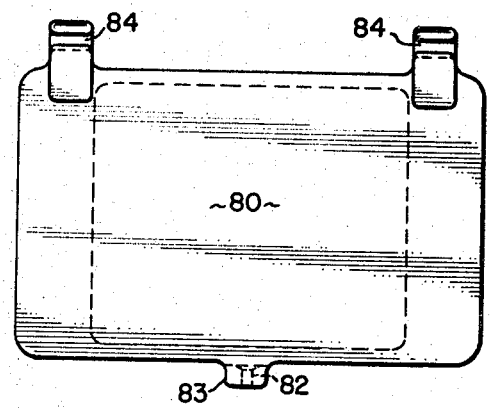
FIG. 10 is a bottom plan view of a cover which is used to block the discharge outlet of the tub when the comminuting machine shown in FIGS. 1, 5 and 8 is disconneced from the machine.

The apparatus can function as a mixer by removing the feed cylinder 14 and feed screw 13 together with their adjuncts as described above (the tub 19 must be removed first to permit the removal of the feed cylinder 14 and then the tub 19 is replaced in operative position). A commodity, such as the ingredients for a salad, is dumped into the tub 19 through its open top, which is closed by a cover 79. When the comminuting machine is disconnected from the apparatus, the paddle 18 functions as mixing means and also as input conveyor means for a receptacle placed below the discharge of the tub 19. To retain the commodity in the tub 19 for mixing, a cover 80 (FIG. 10) is attached over the discharge outlet of the tub by first inserting a pin 81 (FIG. 8) extending from the lower step 24 of the tub bottom into a hole 82 through an upwardly extending leg 83 on the cover 80 (FIG. 10) and then operating the suitcase latches 74 to hook the latch members 75 over hooks 84 on the cover 80, i.e., cover hooks 84 are put in place of the chopper cylinder hooks 76 (FIG. 9). Removal of the cover 80 permits the paddle 18 to feed the mixed food out of the discharge outlet of the tub.

The cover 79 carries two upstanding fingers 85 which are received in openings 86 in plates 87 carried by the front tub wall 20 and pivots in the openings 86 when it is lifted by upwardly directed force applied to a handle 88 attached to a lip 89 on the cover 79. The lip 89 also carries a magnet 90 which cooperates with one of the upper surfaces 27 of the housing 10 to retain the cover in place by magnetic attraction. When the cover 79 is lifted, it can be pulled forwardly until the fingers 85 clear the openings 86 and then it can be removed from the tub. The cover 79 defines a small opening 91 through which seasoning is sprinkled into the tub while the cover 79 is closed and the paddle 18 is rotating. A small cover 92 is pivoted on the larger cover 79 to close the opening 91 when not in use. The opening 91 is too small for the insertion of an operator's hand into the tub 19 to be injured by the rotating paddle 18 and is so located relative to the arm extensions 65 of the recumbent T-shaped paddle 18 that even though the operator can insert a finger or two through the opening 91 he cannot touch the rotating paddle 18. The magnet 90 functions additionally to close a reed switch 93 (FIGS. 8 and 11) carried on a bracket 94 on the inside of the housing 10 immediately below the magnet 90 when the cover 79 is in operative position on the tub 19.

As described above, the paddle drive means, i.e., the pulley 52, hub 54 and hub ring 55, is mounted for rotation on the outer surface of the tube 48 and the paddle 18 is rotated about a generally horizontal axis which coincides with the longitudinal axis of the tube 48. The feed cylinder 14 and its adjuncts make up a comminuting machine or chopper 95 which, for example in the preparation of ground meats, functions as a second-grind chopper. A first-grind chopper 96 which is identical to the second-grind chopper 95 (identical parts being identified by similar reference numbers) is connected to the tube 48 through an adapter 97. The adapter 97 is in the form of a tube which fits snugly in the stationary tube 48 and which has a shoulder 98 against which the end ring 41a bears to hold the adapter 97 against the stationary perforated plate 36a. The adapter 97 is provided with a circumferential groove 99 which receives a curved portion 100 of a latch plate 101 to latch the first-grind chopper 96 to the mixer-chopper apparatus. Ground food is fed out of the first-grind chopper 96 through the adapter 97 and through the stationary tube 48 into the tub 19.

Feeding the commodity through the stationary tube 48, i.e., on the axis of rotation of the paddle 18, has several advantages. If the first-grind chopper 96 were positioned to feed into the open top of the tub 19, the chopper 96 would be so high that it would be inconvenient to feed it. The tube 48 is relatively low. If the hole 47 in the rear tub wall 21 were located lower in the wall 21, it would be difficult to feed through it, because the rotating paddle 18 would keep closing the entrance as it passes nearby, and, since the bottom of the tub stays full of commodity, the commodity itself would obstruct feeding. By feeding on the axis of rotation of the paddle 18, the commodity passes through an unobstructed ingress opening into the tub 19 and then falls down into the bottom of the tub to be mixed and conveyed forwardly. Hence the tube 48 has two functions, one, it mounts the paddle 18 and its drive means for rotation and, two, it feeds food into the tub 19 on the axis of rotation of the paddle 18.

Figure 3:
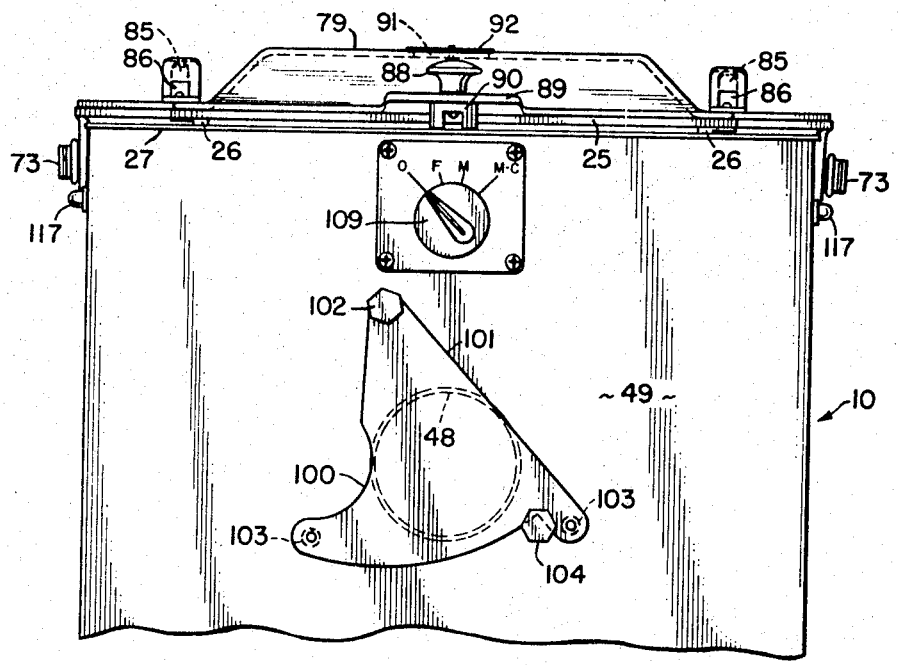
FIG. 3 is an enlarged, fragementary rear elevational view of the upper part of the mixer-chopper shown in FIG. 1 as seen from the rear.
Figure 4:
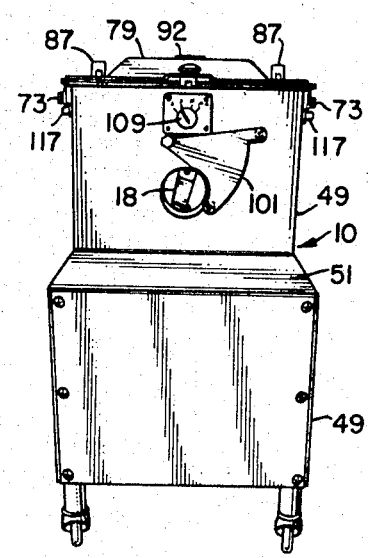
FIG. 4 is a perspective view of the mixer-chopper as seen from the rear.

The latch plate 101 is pivoted by means of a shoulder screw 102 on the rear housing wall 49 and is provided with two nylon buttons 103 (FIG. 3) which keep the wall 49 from getting scratched and which urged the plate 101 against the shoulder of a shoulder screw 104 on the wall 49. The plate 101, thus, tends to remain in the position to which it is moved. In the position of the plate 101 shown in FIG. 3, it covers the exterior end of the tube 48 preventing the entrance of an operator's hand into the tub 19. In the position of the plate 101 shown in FIG. 4, the exterior end of the tube 48 is unobstructed, but, as shown in FIG. 8, when the adapter 97 and the second-grind chopper 96 are in place, the exterior end of the tube 48 is covered. Hence, the latch plate 101 has two functions, in a first position (FIG. 3), it covers the exterior end of the tube 48 to prevent the entrance of an operator's hand or dirt into the tub 19 and, in a second position (FIG. 8) it latches the first-grind chopper 96 to the mixer-chopper apparatus.

Figure 11:
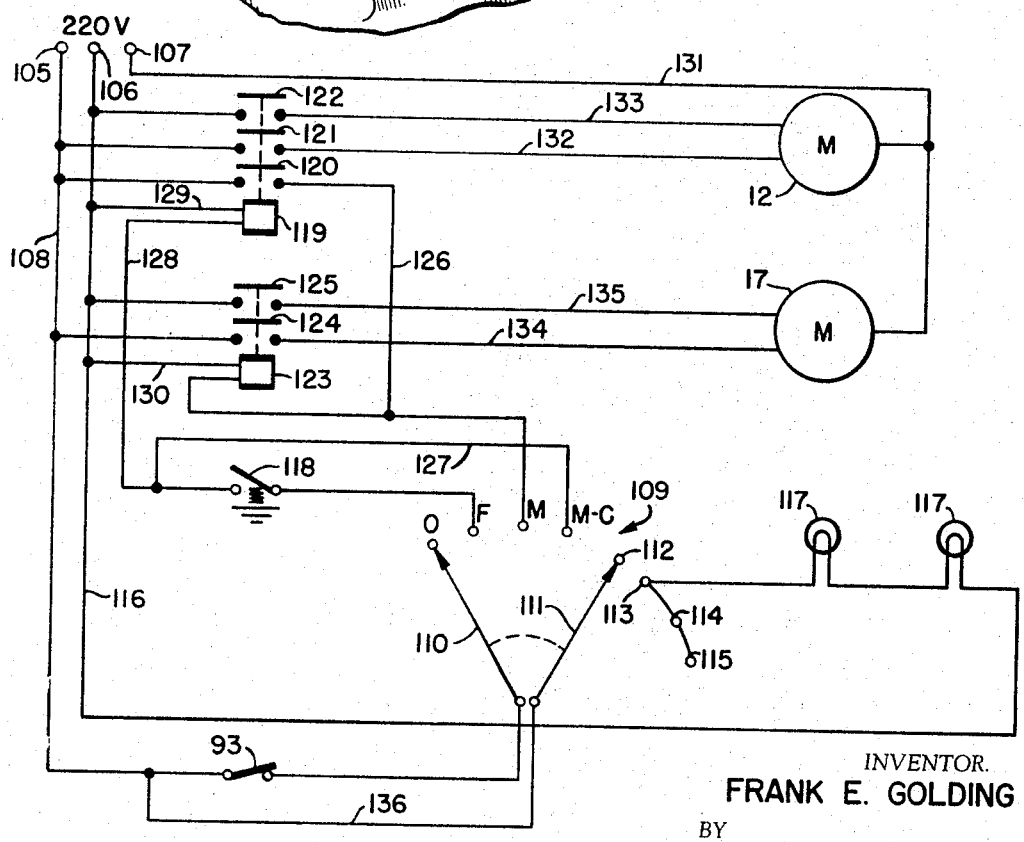
FIG. 11 is an electrical control circuit for the mixer-chopper.

The control circuit is shown in FIG. 11. Voltage (220 volts=3 phase) is applied to terminals 105, 106 and 107. A lead 108 connects terminal 105 through the reed switch 93 (closed by the magnet 90 when it is in its position shown in FIG. 8) to a first deck 110 of a two pole, four position rotary switch 109 (FIGS. 3, 4, 8 and 11) and also connects terminal 105 through a lead 136 which bypasses the reed switch 93 to a second deck 111 of the rotary switch 109. The first deck 110 is movable to connect the lead 108 to four terminals identified as O (off), F (foot-switch), M (mix), and M-C (mix and chop) in FIGS. 3 and 8 and a second deck 111 is movable to terminals 112–115 when the deck 110 is on terminals O, F, M and M-C, respectively. A lead 116 connects terminal 106 to two pilot lamps 117 (FIGS. 1, 3, 4, 5, 8 and 11) which light whenever the switch deck 110 is at a terminal other than terminal O (machine turned off). If the tub cover 79 is opened or if the tub 19 is loosened from the apparatus, the magnet 90 is moved away from juxtaposition with the reed switch 93 and the switch 93 opens as a safety interlock breaking the circuit to the rotary switch 109 and preventing operation of the apparatus.

Switch terminal O is the off terminal. Switch terminal F is connected through a foot-operated switch 118 to a relay 119 having normally open contacts 120–122. Switch terminal M is connected to a relay 123 having normally open contacts 124–125 and to relay contacts 120 through a lead 126. Switch terminal M-C is connected through a lead 127 around the foot-operated switch 118 to a lead 128. Closed relay contacts 120 connect the lead 108 to the lead 126; closed relay contacts 121 connect the lead 108 to the motor 12; closed relay contacts 122 connect the lead 116 to the motor 12; closed relay contacts 124 connect the lead 108 to the motor 17; and closed relay contacts 125 connect the lead 116 to the motor 17. Leads 129 and 130 connect the lead 116 to the relays 119 and 123, respectively. A lead 131 connects terminal 107 to both motors 12 and 17.

In operation, when the rotary switch 109 is turned to terminal F and the foot-switch 118 is closed, a circuit through the lead 128 is closed and the relay 119 is energized. The energized relay 119 closes its contacts 120–

122. The closing of contacts 121-122 causes energization of the motor 12 (leads 132 and 133) which drives the second-grind chopper 95 and the closing of contacts 120 completes a circuit through the lead 126 to energize the other relay 123. The energized relay 123 closes its contacts 124-125 causing energization of the other motor 17 (leads 134 and 135) which drives the mixing paddles 18. The operator can stand in front of the second-grind chopper 95 and start and stop both motors 12 and 17 as he operates the foot-switch 118 when he is filling containers with, for example, ground meat.

When the rotary switch 109 is turned to terminal M, the relay 123 is energized. The energized relay 123 closes its contacts 124-125 causing energization of the motor 17 (leads 134 and 135) which drives the mixing paddles 18. The second-grind chopper motor 12 does not run.

When the rotary switch 109 is turned to terminal M-C, the open foot-switch 118 is bypassed through the lead 127 and the relay 119 is energized. The energized relay 119 closes its contacts 120-122 to energize the motor 12 and the relay 123 as described above in the case where the rotary switch 109 is in position F and the foot-switch 118 is closed. The energized relay 123 closes its contacts 124-125 and the motor 17 is energized.

Hence, when the rotary switch 109 is in position F and the foot-switch 118 is closed and also when the rotary switch 109 is in position M-C both motors 12 and 17 run but, when the rotary switch 109 is in position M, only the mixer motor 17 runs. This is a safety interlock which prevents operation of the chopper motor 12 unless the mixer motor 17 is operating to reduce the chance that the second-grind chopper 95 will be run dry. Of course, both motors 12 and 17 can be run while no commodity is in the tub 19 to supply the chopper 95. This will not injure the chopper 95 over a relatively short period and seldom happens. In the usual case, the operator turns on the apparatus when he is ready to use it for mixing and chopping and in this normal situation he can only turn on the chopper motor 12 and the mixer motor 17 together so that the operating chopper 95 receives commodity from the tub 19 and is not run by itself dry. However, if he wishes to use the apparatus as a mixer (second-grind chopper 95 disconnected from the apparatus), he is able to operate the mixer motor 17 without operating the chopper motor 12 by placing the rotary switch 109 in position M.

It is to be understood that the above description is illustrative of this invention and that various modifications thereof can be utilized without departing from its spirit and scope.

Having described the invention, I claim:

1. Mixer-chopper apparatus comprising, in combination, a food comminuting machine defining an inlet, a tub having a discharge connection with the inlet and a wall defining an ingress opening, a tube extending into the wall opening, drive means rotatably mounted on the tube, and paddle means rotatably mounted in the tube and connected to the drive means, the tube functioning additionally to feed food into the tub on the axis of rotation of the paddle means.

2. Mixer-chopper apparatus according to claim 1 wherein the paddle means provides end thrust to retain the drive means on the tube.

3. Mixer-chopper apparatus according to claim 1 wherein a movably mounted plate functions in a first position to cover the exterior end of the tube preventing the entrance of an operator's hand into the tube and functions in a second position to latch a second comminuting machine to the apparatus.

4. Mixer-chopper apparatus comprising, in combination, a food comminuting machine defining an inlet, a tub having an open top and a discharge connection with the inlet, paddle means rotatably mounted in the tub, a cover pivotally mounted on the tub closing the open tub top, and interlock means comprising magnetically operable switch means and magnet means carried by the cover for holding it in place and for operating the switch means to prevent operation of the apparatus if the cover is opened or if the tub is loosened from the apparatus.

5. Mixer-chopper apparatus according to claim 4 wherein the cover defines a small opening through which seasoning is sprinkled into the tub while the cover is closed and the paddle means is in operation.

6. Mixer-chopper apparatus comprising, in combination, a food comminuting machine defining an inlet, a tub having a discharge connection with the inlet, paddle means rotatably mounted in the tub, a chopper motor for driving the comminuting machine in a mixing and chopping mode, a mixer motor for driving the paddle means in said mode or in an independent mixing mode, and control circuit means for the motors including means for selecting said modes of operation.

7. Mixer-chopper apparatus according to claim 6 having signal means in the control circuit means for indicating operation of either or both motors.

8. Mixer-chopper apparatus according to claim 6 wherein the control circuit means for the motors and the means for selecting said modes comprises switch means having foot switch, mix and mix-chop positions and a foot switch in series with the foot switch position, the control circuit means functioning when the foot switch is operated and the switch means is in its foot switch position to energize both motors, when the switch means is in its mix position to energize the mixer motor but not the chopper motor and when the switch means is in its mix-chop position to energize both motors.

9. Mixer-chopper apparatus according to claim 6 wherein the control circuit means further includes interlock means for preventing operation of the chopper motor unless the mixer motor is operating.

References Cited

UNITED STATES PATENTS

| | | | |
|---|---|---|---|
| 750,121 | 1/1904 | Prade | 259—26 |
| 3,054,431 | 9/1962 | Hartley et al. | 146—186 X |

FOREIGN PATENTS

| | | |
|---|---|---|
| 105,032 | 9/1938 | Australia. |

W. GRAYDON ABERCROMBIE, *Primary Examiner.*

U.S. Cl. X.R.

146—78; 259—9, 25